Patented Oct. 7, 1952

2,613,226

UNITED STATES PATENT OFFICE 2,613,226

BENZYL-TERT.-OCTYLAMINE

W E Craig and Lawrence J. Exner, Philadelphia, Pa., assignors to Rohm & Haas Company, Philadelphia, Pa., a corporation of Delaware No Drawing. Application January 5, 1951, Serial No. 204,690

1 Claim. (Cl. 260—570.9)

This invention relates to the benzyl-tert.-octylamine, having the formula $C_6H_5CH_2NHC(CH_3)_2CH_2C(CH_3)_3$ This compound is an insecticidal agent of the type which causes rapid and effective knockdown of soft-bodied insects and other insects which are attacked through their surfaces. In this respect the compound is exceptional. Even isomers and homologues of this compound fail to provide knockdown action. Since it is compatible with many other types of insecticides, it can be combined therewith to give better over-all action. With some toxicants such as the pyrethrins it is definitely synergistic. Hence, compositions based on pyrethrins and benzyl-tert.-octylamine also provide a definite advance in the insecticide art.

A method for preparing benzyl-tert.-octylamine comprises reacting by condensing together a benzyl halide and tert.-octylamine, $(CH_3)_3CCH_2(CH_3)_2CNH_2$ preferably in molar excess. The resulting acid salt of amine is treated with an aqueous alkaline solution and the resulting salt washed away. The desired product can be purified by distillation. Detailed description of a typical preparation follows.

To 775 parts by weight of the tertiary alkyl amine, $(CH_3)_3CCH_2(CH_3)_2CNH_2$, in a reaction vessel equipped with condenser, stirrer, and thermometer, the amine being heated to 130° C., there was slowly added 379.8 parts by weight of benzyl chloride. The temperature of the reacting mixture rose to 160° C. Some solid material separated near the end of the addition of benzyl chloride, but the reaction mixture become homogeneous when heated to 197° C. The reaction mixture was then cooled and treated with 860 parts by weight of four normal sodium hydroxide solutions. The resulting oil and aqueous layer were separated. The oil was distilled under reduced pressure. The fraction taken at 100°–102° C./1.2 mm. was identified as benzyl-tert.-octylamine, $C_6H_5CH_2NHC_8H_{17}(tert.)$. It contained by analysis 6.3% of nitrogen (theory 6.4%). The yield was 77%. This compound is a colorless oil. It has a refractive index of 1.4983 at 25° C.

This compound was used for the preparation of a 2% solution in deodorized kerosene. This solution was used in Peet-Grady fly tests. It gave a 99% knockdown in ten minutes. There was no objectionable odor or noticeable irritation from this spray.

Under the same conditions of test it was found that there was no knockdown of flies in 10 minutes from kerosene solutions containing 2% of secondary amines having an N-benzyl group and tert.-butyl, tert.-dodecyl, n-octyl, or cyclohexyl as the second N-substituent. There was likewise no knockdown from 2% solutions of 1,4-bis(N-tert.-octylaminomethyl)benzene, tert.-octyl-sec.-octylbenzylamine, chlorobenzyl-tert.-octylamine, N-octylbenzyl-N-tert.-octylamine, and so on.

A self-emulsifying composition was made by mixing one part of benzyl-tert.-octylamine, one part of alkylphenoxypolyethoxyethanol, and two parts of aromatic solvent. This was applied in an aqueous spray at a dilution of 1:400 of the toxicant to bean plants infested with aphids. Action was rapid and a kill of 93% under the test conditions resulted.

This composition was also tested against the milk weed bug at a dilution of 1:400 of toxicant in a water spray, giving a kill of 100%.

Tests with various formulations adapted for use in aerosol bombs demonstrate that benzyl-tert.-octylamine has considerable value, particularly as a knockdown agent and as an adjuvant to pyrethrins.

Knockdown determinations were made at intervals over the course of 10 minutes with kerosene solutions of benzyl-tert.-octylamine at 1%, 2%, and 4%. At 1% concentration knockdown values obtained were 3% at five minutes and 20% at ten minutes. At 2% values were 45% and 98% at five minutes and ten minutes respectively. At 4% values were 71% and 98% at five and ten minutes, respectively.

Knockdown determinations were then made with kerosene solutions containings 50 mg. of pyrethrins per 100 cc. Knockdown values observed were 11%, 58%, and 71% at 1, 5, and 10 minutes, respectively. One cc. of benzyl-tert.-octylamine was then added to 100 cc. of this pyrethrin solution. Knockdown values found were then 19%, 72%, and 90% respectively at 1, 5, and 10 minutes. When two cubic centimeters of the amine were added to 100 cc. of the above pyrethrin solution, knockdown values were found to be 22%, 84%, and 99%.

A similar series of determinations was made with a base spray which was made with 25 mg. of pyrethrins per 100 cc. This base spray gave knockdowns of 7%, 34%, and 55% at 1, 5, and 10 minutes. The spray plus 0.5% of benzyl-tert.-octylamine gave knockdowns of 12%, 53%, and 71%, respectively, at the same time intervals. The spray plus 1% of benzyl-tert.-octylamine gave knockdowns of 18%, 69%, and 97% at 1, 5, and 10 minutes. A spray with 2% of the amine added gave knockdowns of 19%, 83%, and 99% at 1, 5, and 10 minutes, respectively.

The compound

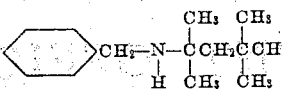

is peculiarly effective as a knockdown agent. It has solubility in organic media, including kerosene and the usual solvents. It has desirable characteristics with respect to odor and irritation. It can be readily prepared from relatively inexpensive starting materials by a simple process. It is compatible with many types of insecticidal agents.

We claim:

As a new chemical compound, benzyl-tert.-octylamine of the formula

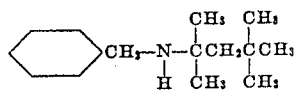

W E CRAIG.
LAWRENCE J. EXNER.

REFERENCES CITED

The following references are of record in the file of this patent:

UNITED STATES PATENTS

| Number | Name | Date |
|---|---|---|
| 1,979,154 | Hannum | Oct. 30, 1934 |
| 2,017,119 | Ellis | Oct. 15, 1935 |
| 2,196,261 | Howland | Apr. 9, 1940 |
| 2,435,690 | Morrill | Feb. 10, 1948 |
| 2,438,370 | Lewis | Mar. 23, 1948 |
| 2,504,803 | Clark | Apr. 18, 1950 |
| 2,540,155 | Wood | Feb. 6, 1951 |